UNITED STATES PATENT OFFICE.

VICTOR MORITZ GOLDSCHMIDT, OF CHRISTIANIA, NORWAY, ASSIGNOR TO TITAN CO. A/S., OF CHRISTIANIA, NORWAY.

PIGMENT AND METHOD OF ITS MANUFACTURE.

1,343,446.  Specification of Letters Patent.  Patented June 15, 1920.

No Drawing.  Application filed September 27, 1918. Serial No. 255,961.

*To all whom it may concern:*

Be it known that I, VICTOR MORITZ GOLDSCHMIDT, a subject of Norway, and a resident of Christiania, Kingdom of Norway, have invented certain new and useful Improvements in Pigments and Methods of Their Manufacture, of which the following is a specification, this application being a continuation in part of my application Sr. No. 167,835, filed May 10, 1917.

This invention relates to pigments consisting of a metallic base and an adsorbed organic coloring matter or dye, such as are generally termed lake pigments. The object of the invention is a new type of such lake pigments and the method of their manufacture.

I have found that various titanium compounds may successfully be used as bases for lake pigments. The amorphous titanium dioxid and titanium dioxid hydrate have proved to be especially suitable for this purpose. Such titanium compounds are easily obtained by precipitation in known manner from solutions of titanium salts, such as sulfate and chlorid solutions. The titanium hydrate thus obtained may be wholly or partly converted to amorphous $TiO_2$ by heating to 500–700° C. The titanium hydrate will in most cases contain a small amount of acid from the solution from which it was precipitated either in the form of a basic salt or an adsorbed acid. In some cases this content of acid may be of advantage to the further treatment, while in other cases it must be eliminated by treatment with a base or a salt combining with and neutralizing the acid.

According to the conditions under which the adsorption is brought about and the substance employed, the adsorption will take place either as a purely physical process or it will be accompanied by the formation of chemical compounds. Different coloring matters may be employed comprising artificial as well as natural coloring matter.

In carrying out my process the titanium hydrate or the titanium dioxid is mixed with water and a solution of the organic coloring matter is added. The adsorption of the coloring matter may be improved by the addition of small amounts of acids or bases to the solution, the substance to be added varying with the character of the coloring matter. I have for instance found that the adsorption of the dye crystal-violet having the formula $C_{25}H_{31}N_3O$, is best carried out in the presence of one gm. NaOH per liter of solution; while on the other hand the dye nigrosin, which belongs to the indulin dyes, is best adsorbed in the presence of one gm. HCl per liter of solution.

In the following specific example of my process I will, however, make use of a dye which needs no addition of acid or base, and for this purpose have chosen the dye eosin. The titanium compound chosen for illustration is titanium hydrate precipitated from a titanium sulfate solution and containing calcium sulfate resulting from the neutralization of the $SO_4$ radical contained in the precipitate. It is to be understood, however, that these materials are chosen for purposes of illustration and that no limination of the invention is to be deducted therefrom.

A convenient titanium hydrate of the character just referred to is one having the following analysis:—72% $TiO_2$, including traces of impurities such as Fe; 10% $CaSO_4$, and 18% water of hydration. This material is placed in a suitable vessel and mixed with equal parts by weight of water. A solution containing 0.5% by weight of eosin, having the formula $C_{20}H_6Br_4O_5H_2$, is added to the mixture and the whole continuously stirred until practically complete adsorption of the eosin has taken place. This will take approximately two hours. The residue comprising the titanium hydrate, calcium sulfate and adsorbed eosin, is then removed by filtration, dried and pulverized to the desired fineness and constitutes a lake pigment of bright red color.

The foregoing detailed description has been given for the clearness of understanding and no undue limitation is to be deduced therefrom and the appended claims are to be interpreted as broadly as permissible in view of the prior art.

What I claim as new and desire to secure by Letters Patent of the United States is:

1. The process of producing pigments, comprising the step of treating titanium compounds with liquids containing a foreign coloring substance in a dissolved or suspended condition.

2. The method of producing lake pigments, which consists in mixing a titanium compound with a solution of coloring matter, whereby the coloring matter is adsorbed by the titanium compound.

3. The method of producing lake pigments, which consists in mixing titanium hydrate with a solution of coloring matter, whereby the coloring matter is adsorbed by the titanium hydrate.

4. The method of producing lake pigments, which consists in mixing a titanium compound comprising titanium hydrate and calcium sulfate with a solution of coloring matter, whereby the coloring matter is adsorbed by the said titanium compound.

5. The method of producing lake pigments, which consists in mixing a titanium compound comprising titanium hydrate, calcium sulfate and titanium dioxid with a solution of coloring matter, whereby the coloring matter is adsorbed by the said titanium compound.

6. The method of producing lake pigments, which consists in mixing a titanium compound comprising titanium hydrate, calcium sulfate and titanium dioxid with a solution of eosin, whereby the eosin is adsorbed by said titanium compound.

7. A pigment substantially consisting of a titanium compound and containing foreign coloring substances carried in an adsorbed condition by the said titanium compound.

8. A pigment comprising a titanium oxygen compound and an organic dye carried in an adsorbed condition by the said titanium compound.

9. A pigment comprising amorphous titanic acid hydrate carrying a foreign coloring substance in an adsorbed condition.

10. A pigment comprising amorphous titanic acid hydrate and an organic dye in an adsorbed condition.

11. A pigment comprising titanium hydrate and an adsorbed coloring matter.

12. A pigment comprising titanium hydrate, calcium sulfate and an adsorbed coloring matter.

13. A pigment comprising titanium hydrate, calcium sulfate and titanium dioxid and an adsorbed coloring matter.

14. A pigment comprising titanium hydrate, calcium sulfate and titanium dioxid and adsorbed eosin.

Signed at Christiania, Norway, on this 9th day of July, 1918.

VICTOR MORITZ GOLDSCHMIDT.